Oct. 2, 1962 E. L. HALL ETAL 3,056,439
ADAPTER FOR CONNECTING POWER DRILLS TO POWERLESS TOOLS
Filed Nov. 27, 1959 4 Sheets-Sheet 1
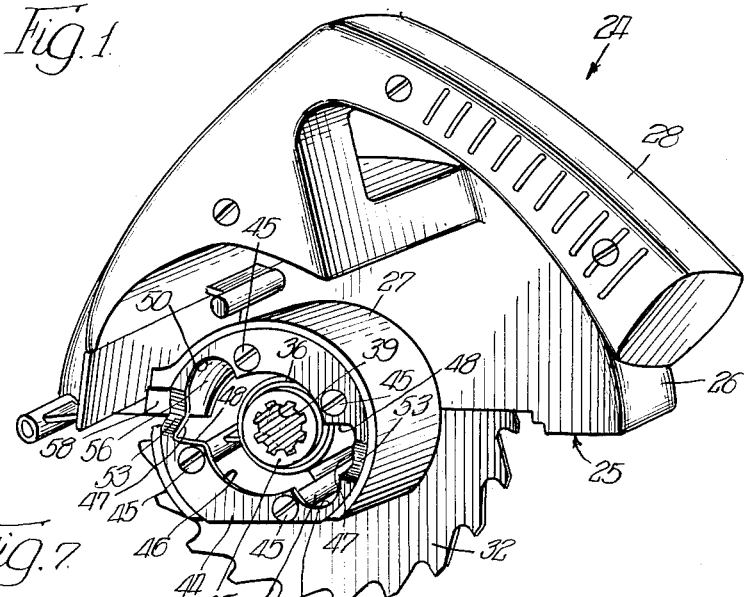
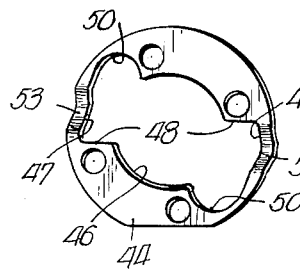
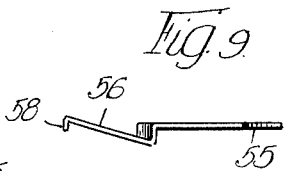
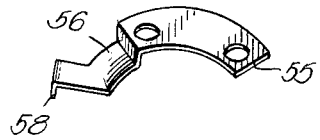
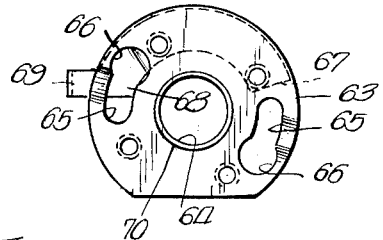
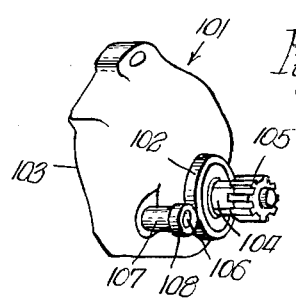
INVENTORS.
Emery L. Hall,
BY Richard H. Kocian,
Cromwell, Greist & Warden
ATTYS.

Oct. 2, 1962 E. L. HALL ETAL 3,056,439
ADAPTER FOR CONNECTING POWER DRILLS TO POWERLESS TOOLS
Filed Nov. 27, 1959 4 Sheets-Sheet 2
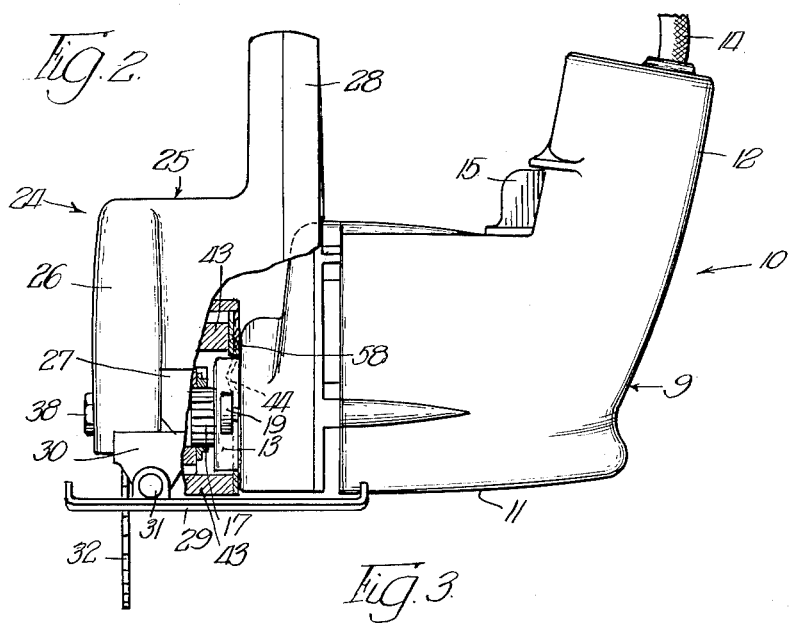
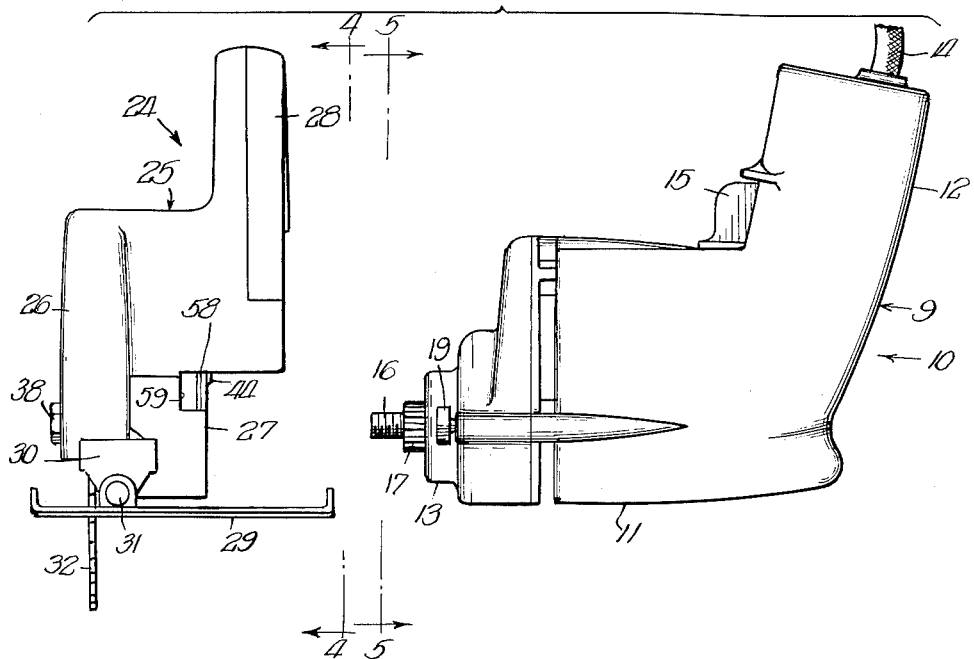
INVENTORS.
Emery L. Hall
BY Richard H Kocian,
Cromwell, Greist & Warden
attys Oct. 2, 1962  E. L. HALL ETAL  3,056,439
ADAPTER FOR CONNECTING POWER DRILLS TO POWERLESS TOOLS
Filed Nov. 27, 1959  4 Sheets-Sheet 3
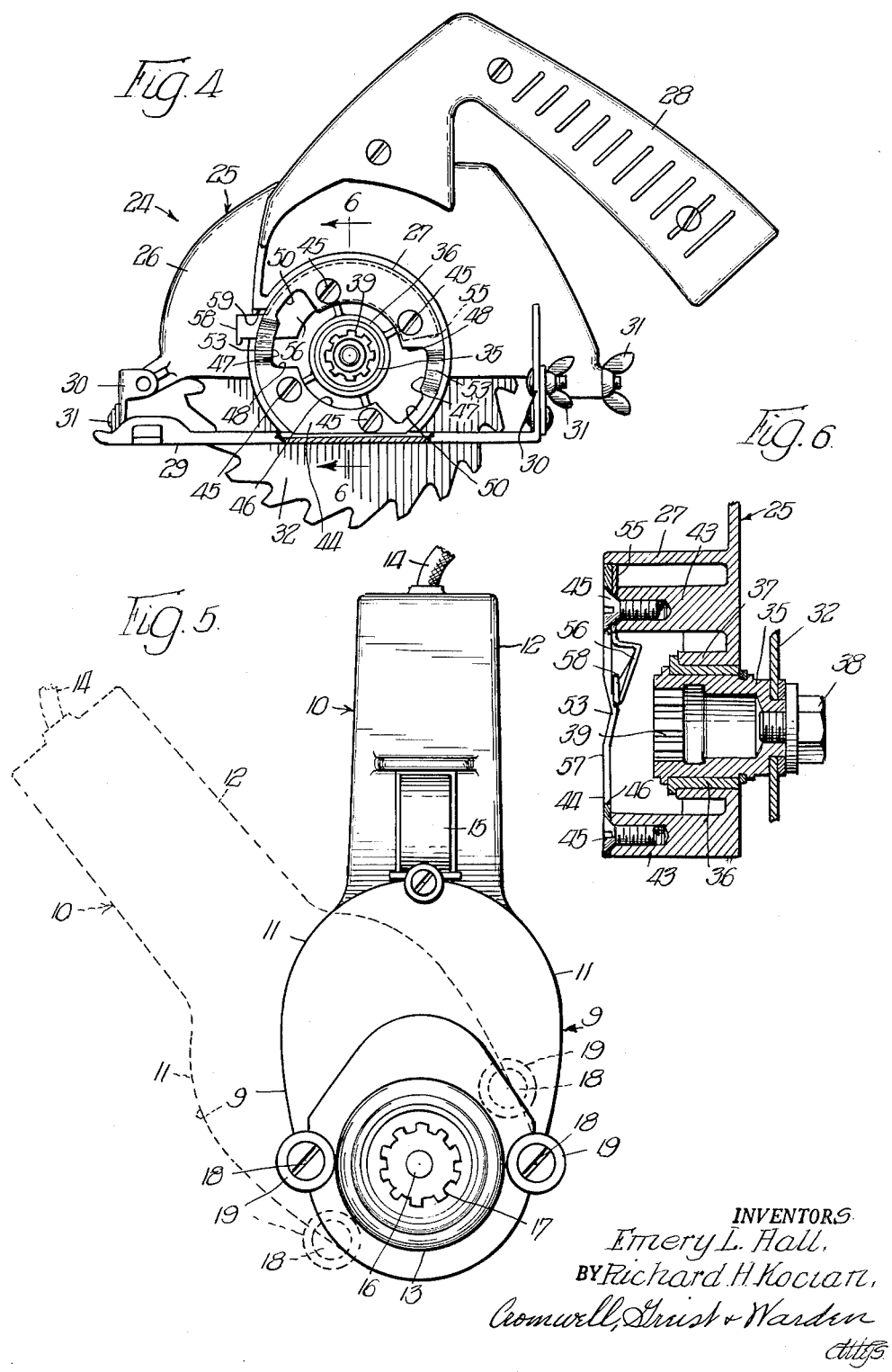
INVENTORS
Emery L. Hall,
BY Richard H. Kocian,
Cromwell, Greist & Warden
Attys.

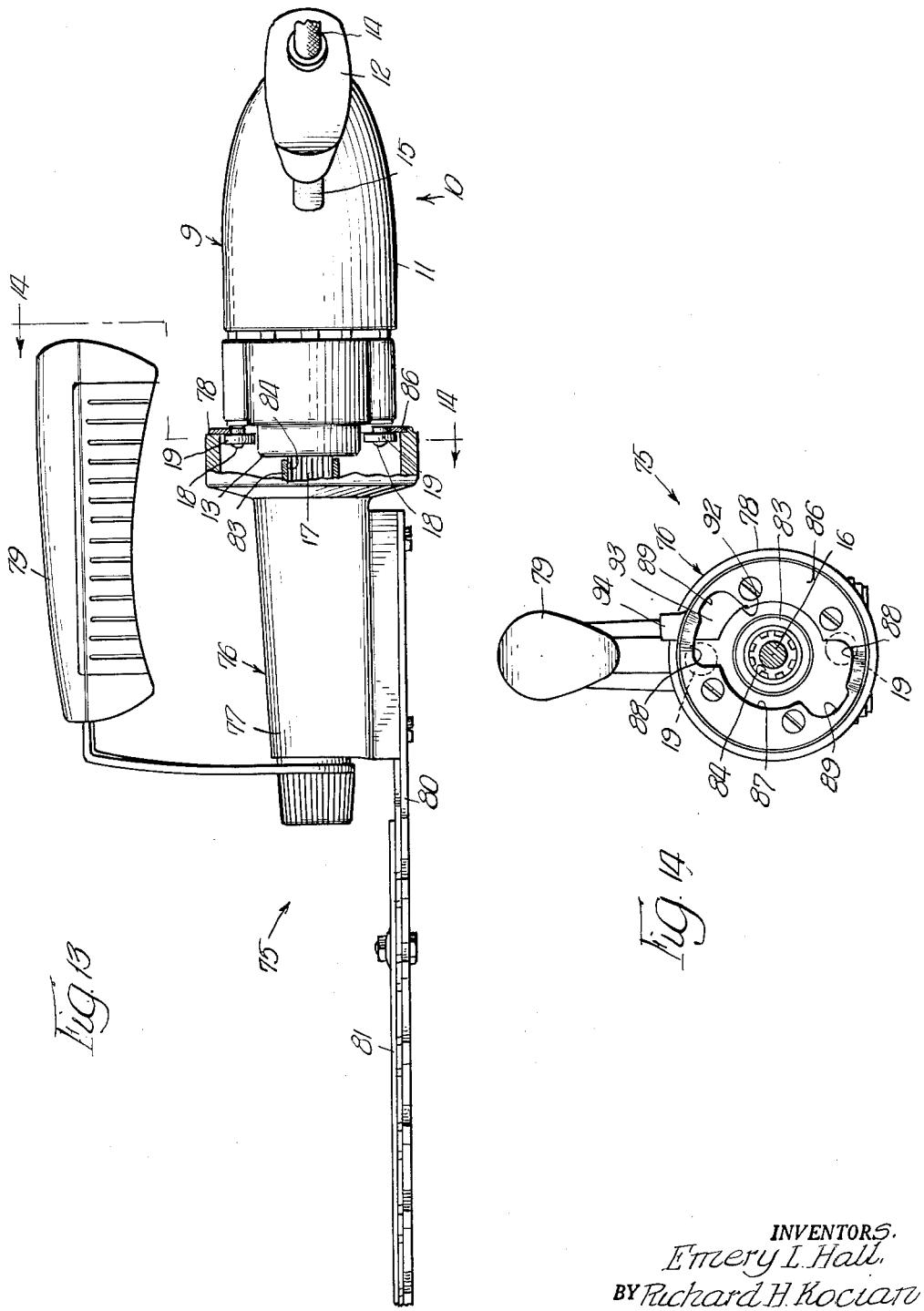

United States Patent Office 3,056,439
Patented Oct. 2, 1962

3,056,439
ADAPTER FOR CONNECTING POWER DRILLS TO POWERLESS TOOLS
Emery L. Hall, Hinsdale, and Richard H. Kocian, Rolling Meadows, Ill., assignors to Skil Corporation, Chicago, Ill., a corporation of Delaware
Filed Nov. 27, 1959, Ser. No. 855,917
7 Claims. (Cl. 144—1)

The present invention relates to a new and improved quick connect-and-disconnect adapter structure for positively interconnecting a hand-operable electric power drill in driving relationship with any one of a series of powerless tools such as rotary saws, hedge trimmers, orbital sanders, jig saws, etc., thereby converting them into power tools.

It has been previously proposed to provide means for interconnecting a hand-operable electric power unit, such as an electric drill, with various powerless tools or attachments. However, such attempts have not been completely satisfactory inasmuch as they have either resulted in sloppy, non-positive connections between the casing of the power unit and the casing of the powerless attachment, as when straps or similar means are utilized, or involved rather complicated, time-consuming assembly and disassembly operations requiring the use of screw drivers, wrenches, bolts, clamps or other fastening devices and tools.

It is therefore the general object of the present invention to provide a new and improved adapter structure whereby a hand-operable electric power drill may be easily connected in a matter of seconds and without the use of tools or separate fasteners to any one of a series of powerless tools to provide a positive locked connection therebetween.

Another important object of the invention is to provide a new and improved adapter structure of the character described wherein the power drill and the powerless tool are positively locked together with the locking means being readily releasable to disconnect the power drill from the powerless tool.

Another object of the invention is to provide a new and improved adapter structure of the character described which provides a rigid positive connection between the power drill and any one of a series of powerless tools whereby a person may obtain a set of power-operated hand tools at a substantially low cost.

Certain other objects of the invention will, in part, be obvious, and will in part appear hereinafter.

For a more complete understanding of the nature and scope of the invention reference may now be had to the accompanying drawings wherein:

FIG. 1 is a perspective view, with the supporting plate removed, of a powerless rotary saw provided with an adapter plate embodying an important part of the invention;

FIG. 2 is a front elevational view, on the same scale and partially in vertical section, of the powerless rotary saw of FIG. 1 operably connected to an electric hand drill by the adapter structure of the invention;

FIG. 3 is a composite front elevational view of the rotary saw and the power drill illustrated in FIG. 2 before interconnection thereof;

FIG. 4 is a side elevational view of the powerless rotary saw taken generally on the line 4—4 of FIG. 3 and showing the quick connect-and-disconnect adapter plate;

FIG. 5 is a front end view of the power drill taken generally on the line 5—5 of FIG. 3 and illustrating the initial positioning of the drill for connection with the powerless rotary saw in broken lines and the fully assembled position of the power drill in full lines;

FIG. 6 is an enlarged fragmentary vertical section taken generally on the line 6—6 of FIG. 4;

FIG. 7 (sheet 1) is a perspective view of the adapter plate;

FIG. 8 is a plan view, on the same scale, of the locking member forming a part of the adapter structure;

FIG. 9 is a side elevational view of the locking member as shown in FIG. 8;

FIG. 10 is a perspective view of the same;

FIG. 11 is an elevational view of a modified form of adapter plate which permits use of the powerless tools with another commercially available hand-operable power drill;

FIG. 12 is a perspective front end view of a commercially available power drill which mates with the adapter plate of FIG. 11 to convert a powerless tool to a power tool;

FIG. 13 (sheet 4) is a side elevational view, partially in vertical section, of a powerless hedge trimmer interconnected with the power drill of FIGS. 2, 3 and 5; and FIG. 14 is a vertical section taken generally on the line 14—14 of FIG. 13.

A hand-operable electric power drill 10 of the type commercially available, for example, under the trademark "SKIL" is illustrated in FIGS. 2, 3, 5 and 13. The power drill 10 includes an outer housing 9 having a main body portion 11, a hand grip portion 12 and a generally cylindrical nose portion 13. An electric power cord 14 extends from the end of the hand grip portion 12, a switch lever in the form of a trigger 15 is located on the hand grip portion 12, and a driven power shaft 16 projects centrally from the nose portion 13. The internal structure of the power drill 10 is not illustrated or described inasmuch as such details are known and comprise no part of the present invention. The driven power shaft 16 is externally threaded and has tightened thereon a spline nut 17. When used for drilling operations, a chuck of known type, e.g. a Jacobs chuck (not shown) is screwed onto the end of the shaft 16 for clamping drill bits therein.

As best illustrated in FIGS. 3, 5 and 13, a pair of studs or fasteners 18 having enlarged head portions or collars 19 protrude or project forwardly from the main body portion 11 of the drill housing 9 on opposite sides of the nose 13 and parallel to the power shaft 16. As will be explained hereinafter, the spline nut 17 comprises an important element of the power transmitting connection between the power drill 10 and the powerless tools while the enlarged heads 19 of the fasteners 18 comprise important elements of the positive and rigid established connection between the housing 9 of the power drill 10 and the housings of the powerless tools.

A powerless rotary saw 24, illustrated in FIGS. 1, 2, 3, 4 and 6, comprises a housing or casing 25 having a blade-receiving portion 26, a cylindrical shaft-receiving portion 27, and a handle portion 28. The housing 25 is suitably connected to a supporting plate 29 having a pair of brackets 30 by means of a pair of fasteners 31 with a circular saw blade 32 extending downwardly through a slot (not shown) in the supporting plate 29. As best illustrated in FIG. 6, the blade 32 is secured on one end of a hollow stub shaft 35 which is journalled in a sleeve bearing 36 seated in a bored neck portion 37 located centrally in the shaft-receiving portion 27 of the housing 25. A nut 38 which tends to tighten when the saw is driven serves to retain the blade 32 on the shaft 35. One end portion of the shaft 35 is disposed within the shaft-receiving portion 27 of the housing 25 and is axially bored and provided with an internal spline formation 39 of a size to mate with the spline nut 17 of the drill 10 whereby to provide a positive driving connection between the power drill 10 and the powerless saw 24.

Thus, when the power drill 10 and the powerless saw 24 are drivingly connected, as described, depressing the trigger 15 of the switch lever of the drill 10 results in high speed rotation of the saw blade 32.

It is further necessary, however, in order to have an effective, safe and usable hand-operable power saw of the character described to provide means for rigidly and positively interconnecting the housing 9 of the power drill 10 and the housing 25 of the powerless rotary saw 24. As best illustrated in FIGS. 1, 4, 6 and 7, a generally flat adapter plate 44 formed of spring stock is secured by screws 45 to a series of posts 43 located in the shaft-receiving portion 27 of the saw housing 25 whereby the plate 44 is disposed over the outer end of the cylindrical shaft-receiving portion 27. The adapter plate 44 is provided with a central opening 46 of a size to receive the nose 13 of the power drill 10 whereby to permit insertion of the spline nut 17 into the spline formation 39 in the end of the shaft 35 for establishing driving engagement therewith.

The adapter plate 44 is further provided with a pair of diametrically opposite arcuately extending cut-away portions or recesses 47 with corresponding ends 48 thereof being located generally in a horizontal plane passing through the axis of the shaft 35 of the powerless saw 24 and with the recesses 47 extending generally clockwise therefrom (as viewed in FIGS. 1, 4 and 7) in the same direction in which the blade 32 is adapted to rotate. In the plate 44 illustrated in FIGS. 1, 4 and 7, the recesses 47 open into the nose-receiving opening 46. The opposite ends of the recesses 47 are enlarged, as at 50, sufficiently to receive the enlarged heads or collars 19 of the fasteners or studs 18 when the nose 13 of the power drill 10 is inserted into the opening 46 with the drill 10 disposed at the angle indicated in broken lines in FIG. 5. When the power drill 10 is fully inserted as described into the opening 46 in the adapter plate 44, the enlarged heads 19 of the fasteners 18 are disposed behind the main body portion of the plate 44. The power drill 10 is then rotated counterclockwise (as viewed in FIGS. 1 and 4) relative to the saw 24 in a direction opposite to the direction in which the saw blade 32 is adapted to rotate whereby the enlarged heads 19 of the fasteners 18 are confined behind the outer edges of the non-enlarged end portions 48 of the recesses 47. During operation of the rotary saw 24, the reverse torque of the drill housing 9 tends to retain the enlarged heads 19 of the fasteners 18 in the end portions 48 of the recesses 47. Portions of the adapter plate 44 defining the outer edges of the recesses 47 are offset adjacent the non-enlarged ends 48 thereof inwardly or away from the drill 10, as at 53, whereby when the power drill 10 is rotated into its fully assembled position relative to the saw 24, as indicated in full lines in FIG. 5, a frictionally tight rigid connection is provided between the housing 9 of the power drill 10 and the housing 25 of the powerless rotary saw 24. The offset portions 53 additionally serve, during assembly of the drill 10 and the saw 24, to draw the drill and saw together along a line co-axial with the axes of the shafts 16 and 35.

Provision is also made for positively locking the power drill 10 and the powerless rotary saw 24 in their fully assembled relationship. An arcuately shaped locking member 55, best illustrated in FIGS. 4, 8, 9 and 10, which is formed of spring metal, has its major body portion secured between the inner surface of the adapter plate 44 and a pair of the posts 43. A non-secured end portion 56 of the locking member or flat spring 55 is sharply offset somewhat away from the adapter plate 44 and extends across the enlarged end 50 of one of the recesses 47 and toward the main body portion of the plate 44. The end portion 56 terminates at a point spaced from the non-enlarged end 48 of the recess 47.

When the nose 13 of the power drill 10 is initially inserted into the opening 46 in the plate 44 of the powerless rotary saw 24, as described, the enlarged head portion 19 of the corresponding fastener 18 engages the non-secured end 56 of the locking member 55 and flexes it away from the adapter plate 44. As the power drill 10 is rotated counterclockwise (as viewed in FIGS. 1 and 4) into its fully assembled position relative to the powerless rotary saw 24, the flexed head portion 19 of the fastener 18 moves past the flexed end portion 56 of the locking member 55 whereby to permit the end portion 56 to spring back toward the adapter plate 44. The end portion 56 is therefore disposed substantially in the same plane as the enlarged head 19 of the fastener 18 whereby to normally interfere with and prevent relative rotation of the power drill 10 in a direction to move the enlarged heads 19 toward the enlarged ends 50 of the recesses 47 for disassembly of the power drill 10 from the rotary saw 24. This assembly of the power drill 10 and the rotary saw 24 may be easily accomplished in a matter of a few seconds.

The end portion 56 of the locking member 55 is provided with a manually manipulatable tab portion 58 (FIGS. 4, 8, 9 and 10) which extends outwardly through a recess 59 formed in the wall of the cylindrical shaft-receiving portion 27 of the saw housing 25 whereby to permit the end portion 56 to be manually flexed away from the adapter plate 44 sufficiently to allow rotation of the power drill 10 in a direction permitting disassembly of the drill 10 from the rotary saw 24. With the structure disclosed herein, the power drill 10 is not only tightly and rigidly interconnected with the powerless rotary saw 24 but it is also positively locked thereto whereby the powerless saw 24 is effectively converted to a power saw.

Existing power drills which are commercially available under the same trademark "SKIL" as the drill 10 illustrated in the drawings and which are not provided with the spline nut 17 on the power shaft 16 or the fasteners 18 having enlarged heads or collars 19 may be readily converted into drills of the type described for interconnection with powerless tools, such as the rotary saw 24. Kits commercially available for such a conversion include one of the spline nuts 17 and a pair of the fasteners 18 having enlarged heads or collars 19. After removal of the drill chuck from the power shaft 16, the spline nut 17 is merely tightened onto the shaft 16. The two fasteners disposed on opposite sides of the nose 13 for connecting the nose 13 to the main body portion 11 of the drill housing 9 are then removed and replaced by the pair of fasteners 18 having the enlarged heads or collars 19. The converted drill may then be operably connected, in the manner described, to the adapter plate 44 of a powerless tool, such as the rotary saw 24.

Inasmuch as at least one of the many commercially available hand-operable power drills has a nose configuration somewhat different than that of the power drill 10 illustrated in the drawings, modified adapter plates may be provided for the rotary saw 24 to accommodate such power drills. One such modified adapter plate 63 is illustrated in FIG. 11. The adapter plate 63 is adapted for use with the rotary saw 24 to accommodate a power drill 101 (FIG. 12) having a nose 102 which is substantially different in form than that of the power drill 10 illustrated in FIGS. 2, 3, 5 and 13. The power drill 101 has a relatively flat, non-protruding nose 102 and, before conversion to the form illustrated in FIG. 12, the heads of the pair of fasteners located on opposite sides of the nose 102 are seated in recesses formed in the drill housing 103. Another conversion kit is provided for converting the basic drill to the form illustrated whereby the drill may be used to convert a powerless tool provided with the adapter plate 63 to a power tool. The spindle of the basic drill is removed and replaced with a screw adapter 104 and a spline nut 105 found in the kit and the two fasteners are removed and replaced with a pair of longer fasteners 106 each of which is provided with a spacer 107 and a collar or enlarged head 108. The above simple steps complete the conversion of the basic drill to a form adapted to be connected to the adapter plate 63. As illustrated, the adapter plate 63 is provided with a central opening 64 for receiving the spline nut 105 of the drill 101, a pair of diametrically opposite arcuately extending recesses or slots 65 having enlarged end portions 66 to accommodate the enlarged heads 108 of the projecting fasteners 106 disposed alongside the nose 102 of the power drill 101, and a locking member 67 formed of spring metal and having a non-secured end portion 68 extending across the enlarged end portion 66 of one of the slots 65 and a manually manipulatable tab 69. The drill 101 is adapted to be connected to the adapter plate 63 in the same manner, previously described herein, that the drill 10 is connected to the adapter plate 44. The flat non-protruding nose 102, however, does not fit in the opening 64 but bears against the portion of the plate 63 disposed between the opening 64 and the slots 65. The edge of the opening 64 may advantageously be formed with an outwardly projecting collar 70 which serves both as a guide for locating the screw adapter 104 and as means for preventing canting of the drill 101.

The disclosed adapter structure of the rotary saw 24 also forms an important part of the structure of a series of powerless tools including a hedge trimmer, a jig saw, and an orbital sander whereby a person may very easily snap the power drill 10 into operable engagement with any one of these powerless tools in a matter of a few seconds whereby to have the use of a number of hand-operable power tools at a substantially low cost.

As an example of the other powerless tools adapted for use with the power drill 10, reference is made to FIGS. 13 and 14 wherein a powerless hedge trimmer 75 adapted for use with the power drill 10 is illustrated. Briefly, the powerless hedge trimmer 75 includes a housing 76 having a main body portion 77 and a cylindrical shaft-receiving portion 78, a handle 79, a fixed elongated saw-tooth blade 80, and a reciprocal elongated saw-tooth blade 81 disposed adjacent to the saw-tooth blade 80. An axially bored shaft 83 which is provided with an internal spline formation 84 of a size to mate with the spline nut 17 of the power drill 10 is rotatably mounted centrally in the shaft-receiving portion 78 of the housing 76. An adapter plate 86, which is identical to the adapter plate 44 of the rotary saw 24, is secured over the outer end of the cylindrical shaft-receiving portion 78 of the hedge trimmer housing 76 and is provided with a central opening 87 which is adapted to receive the nose 13 of the power drill 10. The plate 86 is further provided with a pair of diametrically opposite arcuately extending cut-away portions or recesses 88 each of which is provided with an enlarged end portion 89 of a size adapted to receive therethrough the enlarged head portions 19 of the fasteners 18 on the power drill 10. Also provided is a locking member 92 having an inwardly offset non-secured end portion 93 which extends across the enlarged end portion 89 of one of the recesses 88 and which is provided with a manually manipulatable tab portion 94. The power drill 10 is adapted to be interconnected with the powerless hedge trimmer 75 in exactly the same manner that it is interconnected with the rotary saw 24, as previously described herein, whereby the power drill 10 and the hedge trimmer 75 are positively interlocked to provide a positive driving connection between the drive shaft 16 of the drill 10 and the shaft 83 of the hedge trimmer 75 and a tight and rigid connection between the housing 9 of the power drill 10 and the housing 76 of the hedge trimmer 75.

It will be understood that certain changes may be made in the construction or arrangement of the adapter structure disclosed herein without departing from the spirit and scope of the invention as defined in the appended claims.

We claim:

1. In a powerless tool having a work performing member adapted to be driven, a housing having a cylindrical portion, a rotatable shaft having one end disposed axially in said cylindrical portion and having the other end supporting the work performing member, said one end of said shaft having a bore formed therein with said bore being provided with an internal spline formation whereby said shaft is adapted to be drivingly interconnected with a spline nut secured to the drive shaft of a power drill, an adapter plate secured in the outer end of said cylindrical portion of said housing and having a central opening formed therein adapted for receiving the nose of the power drill housing, at least one arcuately extending recess formed in said plate outwardly of said opening and having one end enlarged sufficiently to receive the enlarged head of a fastener projecting forwardly from the housing of the power drill in parallel relationship to the drive shaft thereof and adjacent to the nose thereof whereupon rotation of the power drill housing relative to said plate engages the head of said fastener behind the edge of said recess at the opposite end thereof, and manually releasable spring latch means having one end secured to the inner surface of said adapter plate and the opposite end yieldably extending across said enlarged end of said recess in said adapter plate for engagement with the side edge of the head of said fastener when the same is positioned in said opposite end of said recess, which latch means serves to positively and rigidly retain the power drill housing connected to the housing of the powerless tool during operation thereof.

2. In a powerless tool having a work performing member adapted to be driven, a housing having a cylindrical portion, means in said cylindrical portion adapted for drivingly interconnecting the drive shaft of a power drill with the work performing member of the powerless tool, an adapter plate secured in said cylindrical portion of said housing outwardly of said interconnecting means and having a central opening formed therein adapted for receiving the nose of the power drill housing, a pair of diametrically opposite arcuately extending recesses formed in said plate outwardly of said opening with each of said recesses having an end enlarged sufficiently to receive the enlarged heads of a pair of elongated fasteners projecting forwardly from the housing of the power drill parallel to the drive shaft thereof and on opposite sides of the nose thereof whereupon rotation of the power drill housing relative to said plate engages the heads of said fasteners behind the edges of said recesses at the opposite ends thereof and serves to positively and rigidly connect the power drill housing to the housing of the powerless tool, and an arcuately shaped flat spring-locking member secured at one end to the inner surface of said adapter plate with its opposite end extending across the enlarged end of one of said recesses and having a finger-engageable tab projecting outwardly from the plate, said opposite end of said locking member being adapted to be flexed away from the plane of said plate by the head of one of said fasteners until said fastener is rotated therepast into engagement with said opposite end of said one recess whereupon said locking member is released for movement toward said plate and for engagement with the edge of the head of said one fastener whereby to lock the power drill housing in engagement with said tool housing until such time that said locking member is manually flexed by means of said tab to permit disengaging said fasteners from said recesses.

3. In combination, a power drill drivingly connected to a powerless tool, said power drill comprising a housing having a projecting nose and a forwardly projecting elongated stud disposed alongside said nose, said stud having an enlarged head at its outer end, said powerless tool comprising a housing having a cylindrical portion, and an adapter plate mounted in said cylindrical portion and having a central opening in which said nose of the power drill is fitted, said plate having an arcuate recess therein which recess is characterized by an end portion of a size sufficient to receive the enlarged head of said stud and an opposite end portion having a width less than the diameter of the head of said stud, said stud being positioned in the reduced-in-width end of said recess with its head engaged behind the edges thereof, and releasable spring means having a yieldable end portion aligned with and biased toward said first mentioned end of said recess in said adapter plate for engagement with the side of the head of said stud to retain the stud in the reduced-in-width end of said recess whereby the housing of the power drill and the housing of the powerless tool are positively and rigidly interconnected, said end portion of said spring means being yieldable away from the plane of said adapter plate to permit connecting and disconnecting the housings of the power drill and the powerless tool.

4. In combination, a power drill drivingly connected to a powerless tool, said power drill comprising a housing, a drive shaft projecting from a nose of the housing, and a projecting fastener disposed alongside said nose and having an enlarged head, said powerless tool comprising a housing having a cylindrical portion, a work performing member mounted in said tool housing and adapted to be driven, and an adapter plate secured in said cylindrical portion and having a central opening in which said nose of the power drill is fitted, said plate having an arcuate recess formed therein which recess is characterized by an end portion of a size sufficient to receive the enlarged head of said fastener and an opposite end portion having a width less than the diameter of the head of said fastener, manually releasable means for positively retaining said fastener in the reduced-in-width end of said recess with its head engaged behind the edges thereof whereby the housing of the power drill and the housing of the powerless tool are positively and rigidly interconnected, said releasable means including a spring member having one end portion secured to the inner surface of the adapter plate and a free end portion biased toward said plate and extending across said first mentioned end portion only of said recess in said plate, said free end portion being yieldable away from the plane of said plate and inwardly of said cylindrical housing portion of the powerless tool to permit movement of the head of said fastener toward and away from said opposite end of said recess in said adapter plate, and inter-engaging means in said cylindrical portion of said tool housing drivingly interconnecting the drive shaft of the power drill and the work performing member of said powerless tool.

5. In a powerless tool including a housing and a work performing member mounted therein, an adapter member rigidly mounted on the housing and having a central opening formed therein adapted for receiving therethrough the drive shaft of a hand-operable power drill for driving engagement with the work performing member, and at least one arcuately extending recess formed in said member outwardly of said opening and having one end enlarged sufficiently to receive the enlarged head of a member projecting forwardly from the power drill adjacent the nose thereof whereby rotation of the power drill relative to said adapter member engages the head of said projecting member behind the edges of said recess at the opposite end thereof and serves to positively and rigidly interconnect the power drill and the powerless tool housing, the edge of said recess in said adapter member being offset intermediate its ends relative to the plane thereof and inwardly of the powerless tool whereby to bias the head of said projecting member in said opposite end of the recess and prevent loosening between the power drill and said tool housing during operation thereof.

6. In a powerless tool, an adapter member having a central opening formed therein adapted for receiving therethrough the drive shaft of a hand-operable power drill, at least one arcuately extending recess formed in said member outwardly of said opening and having one end enlarged sufficiently to receive the enlarged head of a member projecting from the power drill adjacent the nose thereof whereby rotation of the power drill relative to said adapter member engages the head of said projecting member behind the edges of said recess at the opposite end thereof and serves to rigidly interconnect the power drill and the powerless tool, and a flat spring locking member secured at one end to the inner surface of said adapter member with its opposite end extending across the enlarged end of said recess and having a finger engageable tab projecting generally radially away from said adapter member, said opposite end of said locking member being adapted to be flexed away from said adapter member by the head of said projecting member until said projecting member is rotated therepast into engagement with said opposite end of said recess whereupon said opposite end of said locking member is released for movement toward said adapter member and for engagement with the edge of the head of said projecting member whereby to lock the power drill in engagement with said tool until such time that said locking member is manually flexed by means of said tab to permit disengaging said projecting member from said recess.

7. A generally flat adapter plate for interconnecting a power drill housing and a powerless tool housing, said plate being adapted to be mounted on one of said housings and having at least one arcuate recess formed therein for receiving through one end thereof the enlarged head of a member projecting forwardly from the other housing, the opposite end of said recess being reduced-in-width whereupon relative rotation between the two housings results in engagement of the enlarged head of said member behind the edges of said recess at said reduced-in-width end thereof to positively interconnect said two housings, and a flat spring-locking element disposed in the plane of said adapter plate and having one end secured thereto with the opposite end thereof extending across the first mentioned end of said recess and being biased toward the adapter plate, whereby said element is adapted for positively retaining the head of said member in said reduced-in-width end of said recess, said opposite end of said element being adapted to be manually flexed away from the plate to permit engagement and disengagement of the head of said member with the edge of said recess.

References Cited in the file of this patent
UNITED STATES PATENTS

| | | |
|---|---|---|
| 1,055,922 | Landaal | Mar. 11, 1913 |
| 1,577,856 | Wingert | Mar. 23, 1926 |
| 1,637,913 | Nero | Aug. 2, 1927 |
| 1,679,884 | Thomas | Aug. 7, 1928 |
| 1,785,065 | Aborn | Dec. 16, 1930 |
| 1,899,883 | Sacrey | Feb. 28, 1933 |
| 2,531,849 | Karleen | Nov. 28, 1950 |
| 2,539,003 | Agustoni | Jan. 23, 1951 |
| 2,714,905 | Clayton | Aug. 9, 1955 |
| 2,726,689 | Busby | Dec. 13, 1955 |
| 2,822,559 | Manville | Feb. 11, 1958 |